T. B. THOMPSON.
TORSION METER.
APPLICATION FILED FEB. 13, 1914.
1,125,766.
Patented Jan. 19, 1915.
2 SHEETS—SHEET 1.
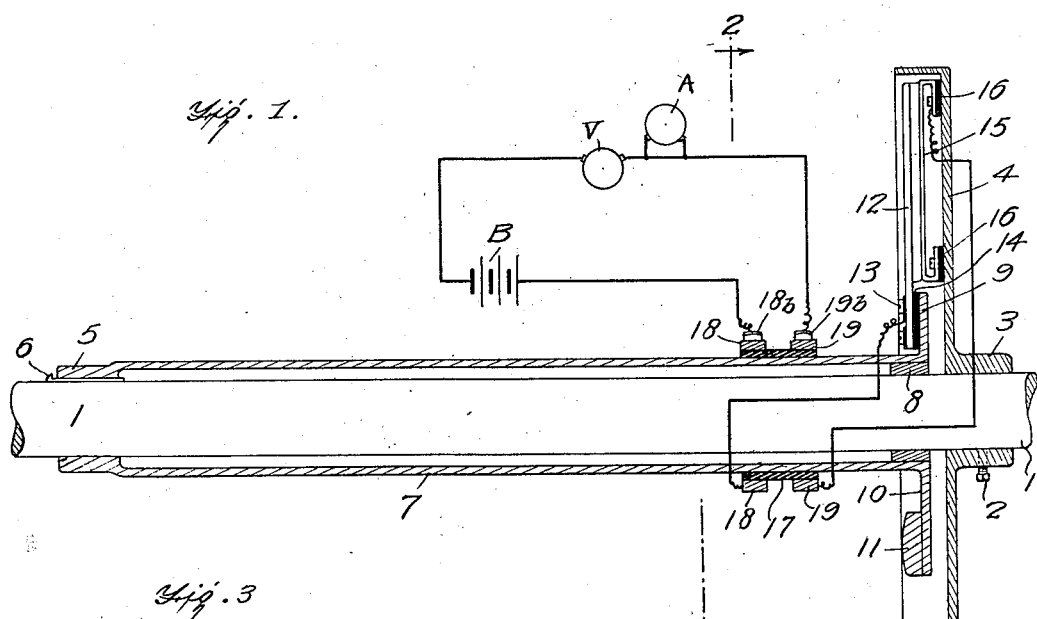
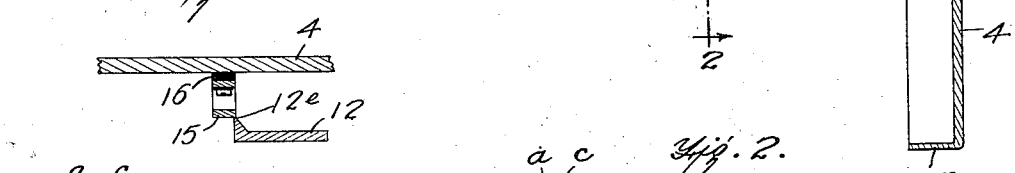
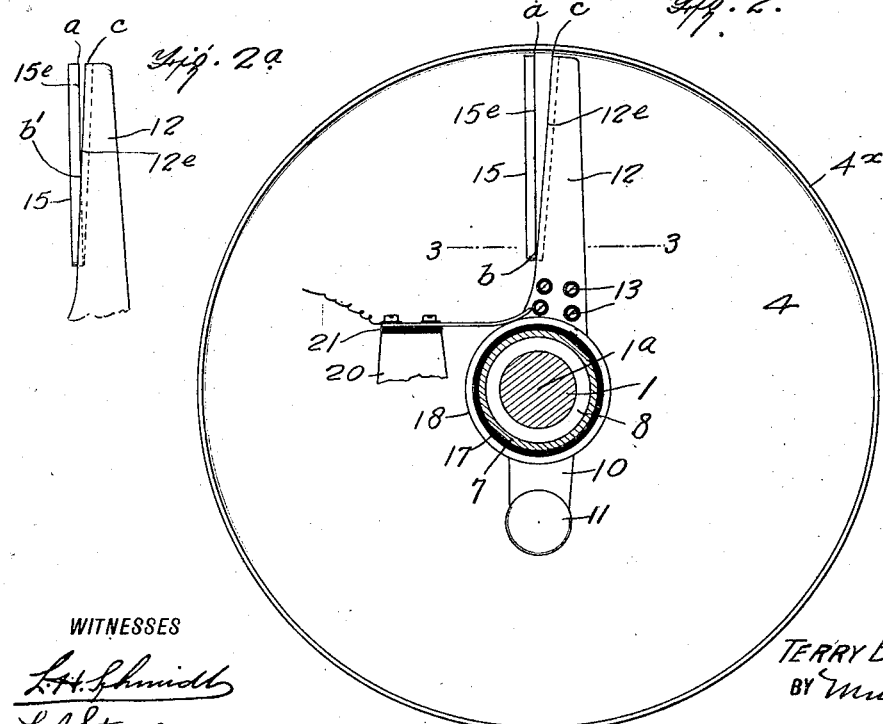
WITNESSES
INVENTOR
TERRY B. THOMPSON,
BY
ATTORNEYS

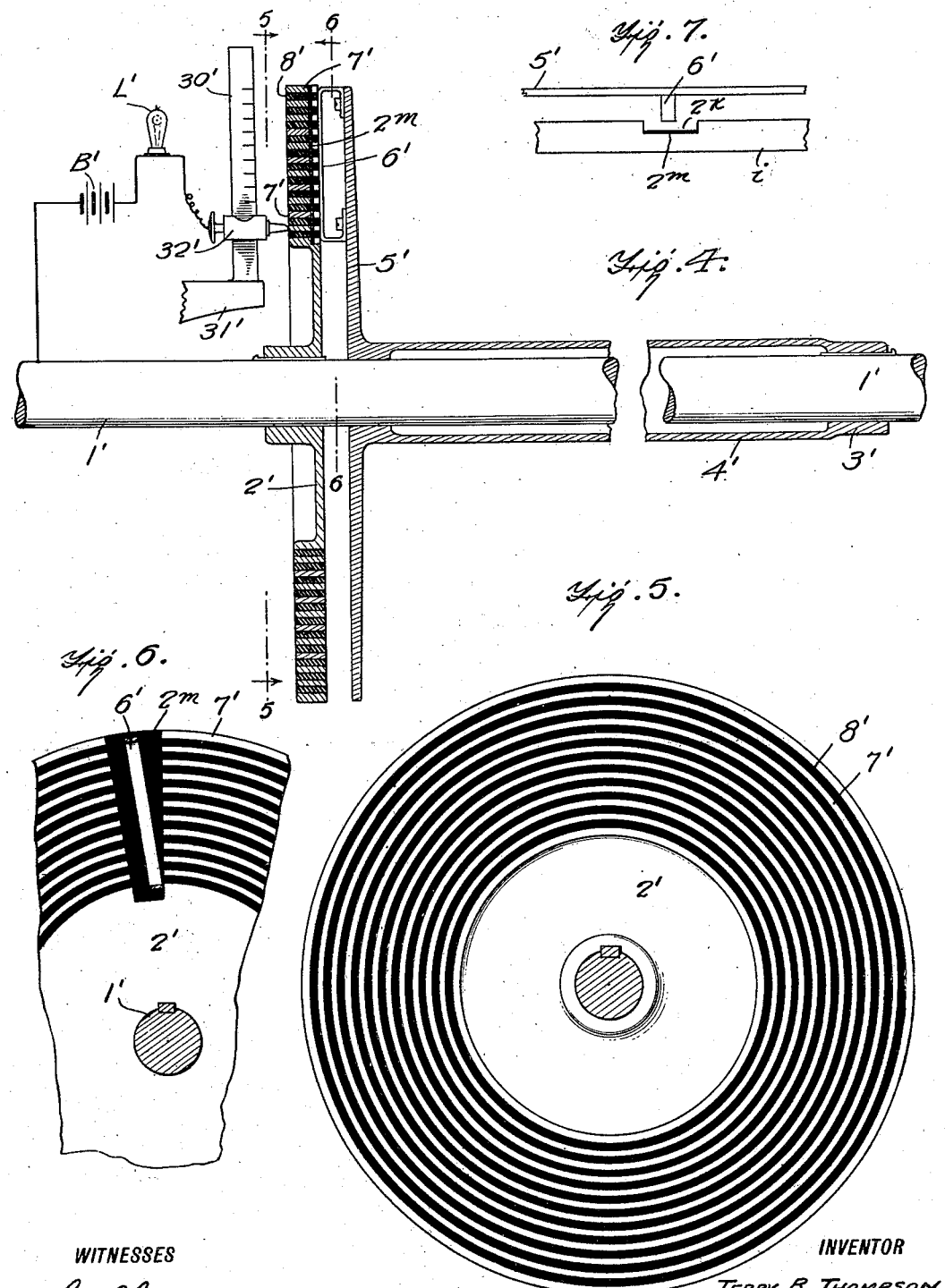

UNITED STATES PATENT OFFICE.

TERRY B. THOMPSON, OF WASHINGTON, DISTRICT OF COLUMBIA.

TORSION-METER.

1,125,766.  Specification of Letters Patent.  Patented Jan. 19, 1915.

Application filed February 13, 1914. Serial No. 818,496.

*To all whom it may concern:*

Be it known that I, TERRY B. THOMPSON, a citizen of the United States, and a resident of Washington, in the District of Columbia, have made certain new and useful Improvements in Torsion-Meters, of which the following is a specification.

My invention relates to devices for measuring the torsion of shafts, especially those shafts which are used in marine engines of the turbine type, and it consists in the combinations, constructions, and arrangements herein described and claimed.

An object of my invention is to provide a device by means of which the amount of torsion developed in a given length of shaft of certain size may be quickly and accurately determined.

A further object of my invention is to provide simple means for accomplishing the measurement of the torsion of the shaft, these means being very inexpensive to make and install, while admitting of great accuracy in measurement owing to the construction of certain parts of the device.

Other objects and advantages will appear in the following specification and the novel features of the device will be particularly pointed out in the appended claims.

My invention is illustrated in the accompanying drawings forming part of this application in which—

Figure 1 is a sectional view of the preferred form of the apparatus, parts of the circuit being shown diagrammatically, Fig. 2 is a sectional view along the line 2—2 of Fig. 1, looking in the direction of the arrow, Fig. 2$^a$ is a view of a portion of the device showing the contacts in their shifted position, Fig. 3 is a sectional view on the line 3—3 of Fig. 2. Fig. 4 is a sectional view through a modified form of the device. Fig. 5 is a section along the line 5—5 of Fig. 4, Fig. 6 is a section along the line 6—6 of Fig. 4, Fig. 7 is a plan view of the portion of the device shown in Fig. 6.

Referring now to Fig. 1, I have shown therein a portion of the shaft 1 whose torsion it is designed to measure. Rigidly secured to a portion of the shaft 1 by means of a set screw 2 or other suitable fastening means is the hub 3 of a disk or plate 4. This plate is shown in the present instance as having a peripheral flange 4$^x$ extending laterally from the main body portion of the disk. At a predetermined distance from the disk 4 a collar 5 is rigidly secured to the shaft 1 by a key 6 or other suitable fastening means. The collar 5 has an integral sleeve 7, which surrounds the shaft, and which extends toward the disk 4, but terminates short thereof. The shaft 1 is provided with a bearing member 8 about which the end of the sleeve 7 is free to rotate. The sleeve has a laterally extending arm 9 on one side and a similar arm 10 on the opposite side. The arm 10 is provided with a counterweight 11, for the purpose of counterbalancing an arm 12 which is secured to the arm 9 by screws 13 or in any other suitable manner, suitable insulation 14 being provided between the arms 12 and 9.

As will be seen from Fig. 1 the disk or plate 4 is provided with a contact member 15 whose ends are bent laterally and then inwardly toward each other, these ends being secured to the plate, but being suitably insulated therefrom by insulating strips 16. The contact member 15 has an edge 15$^e$ which is disposed in radial alinement with the central axis 1$^a$ of the shaft 1. The arm 12 has an edge 12$^e$, which is disposed in angular relation with the edge 15$^e$ of the contact member 15. Disposed on the sleeve 7 is an insulating ring 17 bearing two conducting rings 18 and 19 respectively. A brush 18$^b$ bears on the ring 18 and a similar brush 19$^b$ bears on the ring 19. These brushes are carried by a fixed standard 20, suitable insulations 21 being provided. A battery B is connected to the brush 18$^b$ on one side and to the brush 19$^b$ on the other side. A voltmeter V and an ammeter A are included in the circuit between the battery and the brush 19$^b$.

From the foregoing description of the various parts of the device the operation thereof may be readily understood.

Consider now Fig. 2. The edge 15$^e$ of the contact member 15 extends from the point $a$ to a point $b$ where it begins to curve toward the plate. The available contact surface of the contact edge 15$^e$ of the arm 15 is therefore between the points $a$ and $b$. The point $c$ is at the extreme end of the arm 12 and in alinement with the edge 12$^e$. The plate 4 which bears the arm 15, is set in such a position that the distance $a$—$c$ is such that a maximum torsion of the shaft will cause the point $c$ to move to the point $a$, or when the shaft is in its normal idle position to reseat again to its original position, as shown in Fig. 2. The edge 12ᵉ of the arm 12 is constructed so that when it is in its normal position, shown in Fig. 2, the arm will engage the contact 15 at the point b, the distance a—b being an arbitrary distance. Now when the shaft is in operation a certain amount of torsion must necessarily be developed between the collar 5 and the disk 4 and hence the arm 12 will move relatively to the contact 15. The point at which the edge 12ᵉ of the arm 12 makes contact with the spring contact member 15 will therefore shift to a position nearer the point a, as denoted by b' in Fig. 2ᵃ, thus cutting out resistance in the contact member 15. When the parts are in their normal position, as shown in Fig. 2, the resistance of the contact member 15 may be determined by means of the voltmeter and ammeter in the circuit and when the device is in the position shown in Fig. 2ᵃ the resistance can also be determined. From a comparison of the relative resistances a—b and a—b' the torsion of the shaft may be readily obtained. Obviously the distances a—b and c—b may be made large as compared with the distance a—c, and therefore there may be considerable variation in the resistance of the length of contact member 15 in the circuit, even though the distance a—c may be very small, and therein lies one of the advantages of this device.

As will be seen from Fig. 1, the circuits are so connected up as to permit the revolution of the disk and the arm, while the brushes 18 and 19 afford a constant connection of the measuring instrument with the movable contact members.

In Figs. 4 to 7 inclusive I have shown a modified form of the device in which there is a shaft 1' bearing a fixed disk 2' and having a collar 3' bearing a sleeve 4' to which is secured a disk 5' bearing a spring contact 6'. The disk 2' is provided with a series of conducting segments 7' spaced apart by insulating strips 8'. A portion of the disk 2' is cut away, as shown at 2ᵏ in Fig. 7 and is provided with an insulating plate 2ᵐ at the bottom of the recess. The edge of this recess is radially disposed with respect to the center of the shaft 1' and the conducting strip 6' is angularly disposed with respect to the radial line through the center of the shaft, this angle being determined in the same manner as already described in connection with Fig. 1. A scale 30' is disposed on a standard 31' arranged to engage the contacts 7' of the disk 2'. A battery B' is in circuit with a lamp L', which is connected with the slidable contact 32', the battery being electrically connected to the shaft 1' on the opposite side. In this form of the device, it will be apparent that when the shaft is in its normal position, i. e., when there is no strain upon it, the contact member 6' will be in the position indicated in Fig. 6. When, however, there is torsion applied to the shaft, then the contact member 6' will move toward the edge of the recess which is in radial alinement with the center of the shift 1', thereby making contact with the conducting segment 7'. The current from the battery B' will flow through the lamp L' and light the latter up as soon as the contact 32' is in engagement with one of the conducting segments. Now by shifting the contact 32' along the scale, a point will be found where the circuit will be broken and the lamp L' will not light up. This point is, of course, the intersection of the contact 6' with the radial line through the ends of the contact member 7'. The amount of movement of the contact 32' along the scale may be read directly from the scale and from this the torsion of the shaft may be readily obtained.

I claim:

1. In a torsion meter, the combination with a shaft, of a conducting member secured to said shaft and having a linear edge, conducting means also secured to the shaft and being provided with a linear edge angularly disposed with respect to the linear edge of the first named conducting member, one of said conductors being insulated from the shaft, said conductors being adapted to move through the torsion of the shaft to engage the other conductor at different portions along its linear edge, a source of current connected to both of said conductors, and means for determining the point of contact of the two conductors.

2. In a torsion meter, the combination with a shaft, of a pair of conducting members rigidly secured to the shaft at different points along the shaft, each of said conducting members being provided with a linear edge, the linear edge of one of said members being disposed in angular relation with the linear edge of the other member, the linear edge of one of said members lying in a radial plane through the axis of the shaft and the linear edge of the other member intersecting said radial plane and arranged to form an electrical contact at such point of intersection, one of said conducting members being insulated from the shaft, and electrical means for determining the point of contact of said conducting members while the shaft is rotating.

3. In a torsion meter, the combination with a shaft, of a pair of conducting members rigidly secured to the shaft at different points along the shaft, each of said conducting members being provided with a linear edge, the linear edge of one of said members being disposed in angular relation with the linear edge of the other member, the linear edge of one of said members lying in a radial plane through the axis of the shaft and the linear edge of the other member intersecting said radial plane and arranged to form an electrical contact at such point of intersection, one of said conducting members being insulated from the shaft, a source of current, electrical connections from said source of current to both of said conducting means, and electrical devices in circuit with said source of current and affected by the movement of the point of contact for determining the position of the point of contact.

4. In a torsion meter, the combination with a shaft, of a pair of conducting members rigidly secured to the shaft at different points along the shaft, one of said conducting members being insulated from the shaft and each of said conducting members being provided with a linear edge, the linear edge of one of said members being disposed in angular relation with the linear edge of the other member, the linear edge of one of said members lying in a radial plane with the axis of the shaft, the linear edge of the other member intersecting said radial plane and making electrical contact with the linear edge of the first named member, a pair of conducting rings carried by the shaft and insulated therefrom, one of said rings being in electrical connection with one of said conducting members and the other of said rings being in electrical connection with the other of said conducting members, a source of current, electrical connections between said source of current and each of said rings, and measuring devices disposed between said source of current and one of said rings for determining the point of contact of the conducting members.

5. In a torsion meter, the combination with a shaft, of a pair of conducting members rigidly secured to the shaft at different points along the shaft, one of said conducting members being insulated from the shaft and each of said conducting members being provided with a linear edge, the linear edge of one of said members being disposed in angular relation with the linear edge of the other member, the linear edge of one of said members lying in a radial plane with the axis of the shaft, the linear edge of the other member intersecting said radial plane and making electrical contact with the linear edge of the first named member, a pair of conducting rings carried by the shaft and insulated therefrom, one of said rings being in electrical connection with the inner end of one of said conducting members and the other of said rings being in electrical connection with the other of said conducting members, a source of current, electrical connections between said source of current and each of said rings, a voltmeter and an ammeter disposed between said source of current and one of said rings for determining the point of contact of the conducting members.

TERRY B. THOMPSON.

Witnesses:
R. A. STANLEY,
SOLON C. KEMON.